US011164058B2

(12) United States Patent
Aoyama et al.

(10) Patent No.: US 11,164,058 B2
(45) Date of Patent: Nov. 2, 2021

(54) INFORMATION RECORDING OBJECT (71) Applicant: Dai Nippon Printing Co., Ltd., Tokyo (JP)

(72) Inventors: Yuko Aoyama, Tokyo (JP); Jun Sato, Tokyo (JP); Toshihisa Yamakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 139 days.

(21) Appl. No.: 16/493,487

(22) PCT Filed: Mar. 7, 2018

(86) PCT No.: PCT/JP2018/008783
§ 371 (c)(1),
(2) Date: Sep. 12, 2019

(87) PCT Pub. No.: WO2018/173756
PCT Pub. Date: Sep. 27, 2018

(65) Prior Publication Data
US 2021/0158116 A1   May 27, 2021

(30) Foreign Application Priority Data

Mar. 22, 2017   (JP) .............................. JP2017-055631

(51) Int. Cl.
*G06K 21/06* (2006.01)
*G06K 19/06* (2006.01)
(52) U.S. Cl.
CPC .............................. *G06K 19/06037* (2013.01)

(58) Field of Classification Search
CPC ....... G06K 19/06056; G06K 19/06065; G06K 19/06075; G06K 19/10; G06K 19/16; G06K 19/06037
See application file for complete search history.

(56) References Cited

U.S. PATENT DOCUMENTS 5,786,586 A * 7/1998 Pidhirny ............ G06K 7/10881
235/454
10,252,563 B2 * 4/2019 Rich ........................ G02B 5/18
(Continued)

FOREIGN PATENT DOCUMENTS

JP   2003-281482 A   10/2003
JP   2013-111781 A    6/2013
(Continued)

OTHER PUBLICATIONS

International Search Report dated Jun. 5, 2018, issued for PCT/JP2018/008783.

*Primary Examiner* — Thien M Le
(74) *Attorney, Agent, or Firm* — Locke Lord LLP; James E. Armstrong, IV; Nicholas J. DiCeglie, Jr.

(57) ABSTRACT

Provided is an information recording object designed such that a read angle of embedded information is easily assessed. An information recording object, which comprises a combined image including an image C1 and an image C2 formed on the image C1, is configured so that the image C1 and the image C2 are different patterns generated according to specific rules and so that the reflected light quantities differ due to respective viewing angles, and the image C1 and/or the image C2 can be recognized in the combined image in accordance with the viewing angle, and the combined image has an angle-specifying area formed using a material having the same reflected light quantity as the image C2.

8 Claims, 10 Drawing Sheets

(56) References Cited

U.S. PATENT DOCUMENTS

| | | | |
|---|---|---|---|
| 2004/0233463 A1 | 11/2004 | Hersch et al. | |
| 2008/0079805 A1* | 4/2008 | Takagi | H04N 13/305 |
| | | | 348/51 |
| 2009/0316098 A1* | 12/2009 | Ishihara | C09K 19/3059 |
| | | | 349/131 |
| 2012/0211567 A1* | 8/2012 | Herzig | G06F 17/00 |
| | | | 235/488 |
| 2013/0335463 A1* | 12/2013 | Chiang | H04N 13/356 |
| | | | 345/697 |
| 2017/0316304 A1 | 11/2017 | Aoyama et al. | |
| 2017/0357737 A1* | 12/2017 | Li | G06F 21/10 |
| 2018/0192037 A1* | 7/2018 | Sumi | H04N 13/351 |
| 2019/0025472 A1* | 1/2019 | Cheng | G02B 3/0031 |

FOREIGN PATENT DOCUMENTS

| | | |
|---|---|---|
| JP | 2016-093895 A | 5/2016 |
| WO | 2016/075999 A1 | 5/2016 |

* cited by examiner

INFORMATION RECORDING OBJECT

TECHNICAL FIELD

The present invention relates to an information recording object.

BACKGROUND ART

A digital watermarking technique of embedding specific information in an image or the like is known in the related art. When this technique is used for printed matters, information can be embedded at a level at which the information cannot be visually recognized by a person, and thus artistic effects of the printed matters are not damaged. In addition, information embedded in the printed matters can be read by a reading device.

When the embedded information is used for, for example, authenticity determination, it is preferable that the embedded information be difficult to be estimated from a copy. For this reason, a technique relating to an information recording object which is devised to make it difficult to estimate embedded information is disclosed (for example, Patent Document 1).

Patent Document 1: Japanese Unexamined Patent Application, Publication No. 2016-93895

DISCLOSURE OF THE INVENTION

Problems to be Solved by the Invention

The one described in Patent Document 1 needs to adjust the read angle of the embedded information by holding a reader such as a smartphone over the embedded information, but it is difficult to assess the read angle.

An object of the invention is to provide an information recording object designed such that a read angle of embedded information is easily assessed.

Means for Solving the Problems

The invention achieves the above-mentioned object using the following solving means. According to a first invention, there is provided an information recording object having a combined image including a first image and a second image formed on the first image, wherein the first image and the second image are different pattern images generated by a specific rule, wherein each of the first and second images is configured so as to have a different reflected light quantity depending on an viewing angle, wherein at least one of the first and second images in the combined image is recognizable depending on the viewing angle, and wherein the combined image has an angle-specifying area formed by using a material having the same reflected light quantity as the second image.

A second invention is the information recording object according to the first invention, wherein the angle-specifying area is a second image area where the second image is formed, and wherein the second image area is formed in a portion of a first image area where the first image is formed.

A third invention is the information recording object according to the second invention, wherein the second image area constitutes a pattern.

A fourth invention is the information recording object according to the first invention, wherein the angle-specifying area is disposed at a position different from that of an area having the combined image.

A fifth invention is the information recording object according to the first invention, wherein the angle-specifying area is a second image area where the second image is formed, and at least a portion of the angle-specifying area protrudes from a first image area where the first image is formed.

A sixth invention is the information recording object according to the first invention, wherein data corresponding to a code is generated by performing a converting process corresponding to the rule on the second image, and wherein data hindering the code corresponding to the second image is generated by performing the converting process corresponding to the rule on the first image.

A seventh invention is the information recording object according to the first invention, wherein the first image is formed with a color element having low brightness, and wherein the second image is arranged on a viewing side of the first image and is formed with a color element having brightness higher than that of the first image.

An eighth invention is the information recording object according to the first invention, wherein the first image is made of a lustrous material, and wherein the second image is made of a transparent material.

Effects of the Invention

According to the invention, it is possible to provide an information recording object designed such that a read angle of embedded information is easily assessed.

PREFERRED MODE FOR CARRYING OUT THE INVENTION

Hereinafter, a mode for carrying out the invention will be described with reference to the drawings. The mode is only an example and the technical scope of the invention is not limited to the mode.

EMBODIMENT

Figure 1A:
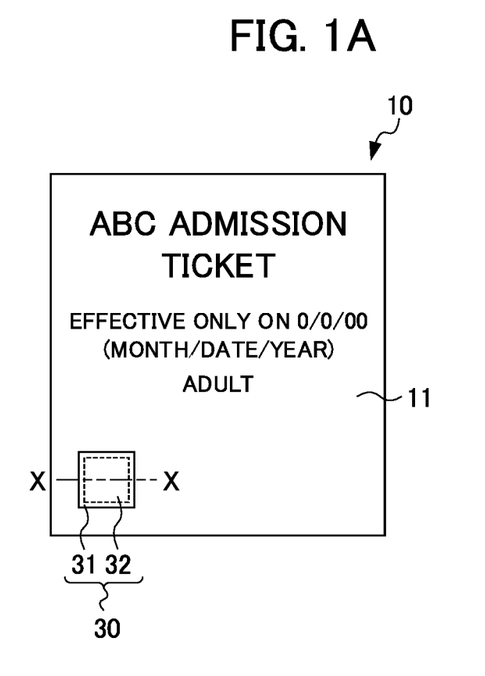
FIG. 1A is a diagram illustrating a printed matter according to an embodiment.
Figure 1B:
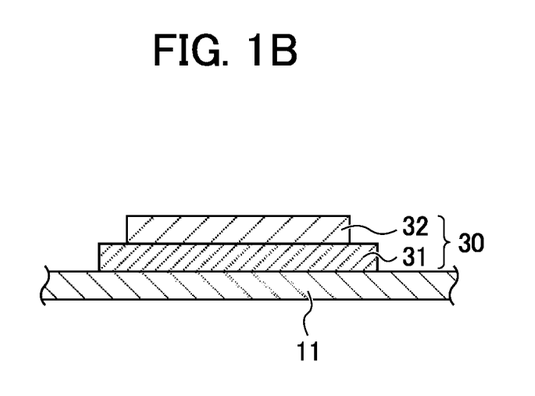
FIG. 1B is a diagram illustrating the printed matter according to the embodiment.

FIGS. 1A and 1B are diagrams illustrating a printed matter 10 according to an embodiment.

<Printed Matter 10>

The printed matter 10 illustrated in FIG. 1A is, for example, a ticket such as an admission ticket. For example, the printed matter 10 has a monetary value in itself, but a copied product obtained by copying the printed matter 10 does not have a monetary value. The printed matter 10 includes a sheet 11 and an information recording object 30. The sheet 11 is a substrate that is the basis of the printed matter 10 and is formed with, for example, a white sheet of paper. The sheet 11 is not limited to the white sheet of paper, but the sheet may be other sheet such as a sheet of high-quality paper, a sheet of coated paper, a sheet of tack paper, a plastic card, or a film, as long as the sheet has a plane capable of carrying a printed image. In this example, the printed image relates to details of the ticket.

<Structure of Information Recording Object 30>

The information recording object 30 is disposed on the surface side of the sheet 11. On the information recording object 30, for example, information which is used for authenticity determination such as a code is printed by latent image printing. An image printed on the information recording object 30 is changed by changing the viewing direction of the sheet 11. FIG. 1B is a partial schematic cross-sectional view taken along the line XX in FIG. 1A. As illustrated in FIG. 1B, the information recording object 30 includes a combined image including a lustrous layer 31 (first image area) and a transparent layer 32 (second image area, angle-specifying area) on the sheet 11. The combined image is an image formed by a combined layer in which the lustrous layer 31 and at least a portion of the transparent layer 32 overlap each other. The lustrous layer 31 is a layer on which a pattern image (first image) is printed with an ink containing a lustrous material. The transparent layer 32 is a layer on which a pattern image (second image) different from the pattern image of the lustrous layer 31 is printed with a transparent ink. The transparent layer 32 is formed on a portion of the lustrous layer 31. In this example, the lustrous layer 31 and the transparent layer 32 have a square shape, and the transparent layer 32 is slightly smaller than the lustrous layer 31. That is, the combined image is an image when the pattern image of the lustrous layer 31 and at least a portion of the pattern image of the transparent layer 32 overlap each other.

Herein, a method for manufacturing the information recording object 30 will be described in brief. First, a sheet 11 on which details of a ticket have been printed in advance is prepared, and a pattern image is gravure-printed on the sheet 11 as a lustrous layer 31 with a lustrous ink containing a lustrous material. The ink containing a lustrous material which is used to draw the pattern image is, for example, an ink containing a lustrous material exhibiting a silver color, a blue gold color, or a red gold color and containing aluminum powder, copper powder, zinc powder, tin powder, or iron phosphide as a component. Next, another pattern image is superimposed and gravure-printed as the transparent layer 32 on the pattern image of the lustrous layer 31 with a transparent ink or the like. The ink which is used to draw the other pattern image is, for example, a matte OP varnish, a transparent varnish, an ink varnish, a transparent ink, or a medium ink. In addition, these inks may be any printing ink such as a UV-curable ink, an oxidation-polymerization type ink, a permeation type ink, an overheat-drying ink, and a vaporization-drying ink. In addition, these materials used for the lustrous layer 31 and the transparent layer 32 described above are examples, and other materials may be used as long as the reflected light quantity varies depending on the viewing angle.

Herein, the thickness of the ink to be applied is, for example, about 1 micrometer. In addition, the thickness of the ink is not limited thereto. In addition, for example, the thickness of the ink may be changed depending on the material. The printing process described above is not limited to gravure printing, but may be wet offset printing, dry offset printing, relief printing, waterless lithographic printing, flexographic printing, screen printing, intaglio printing, or the like.

Figure 3A:
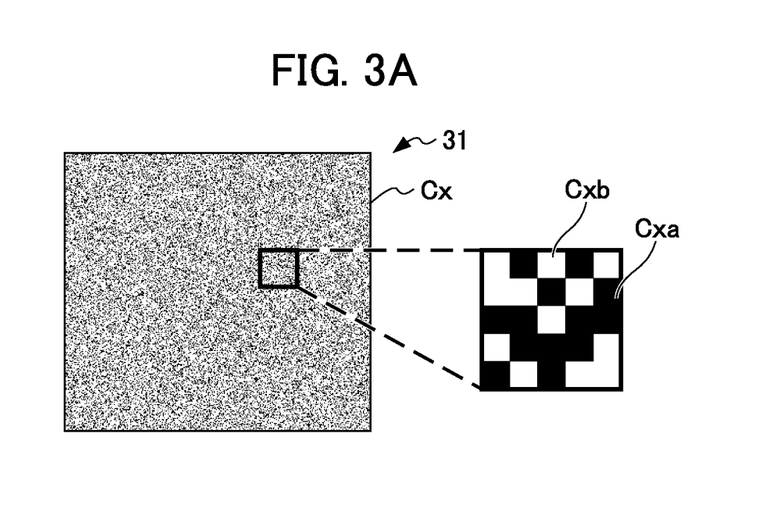
FIG. 3A is a diagram illustrating an example of a pattern image of the information recording object according to the embodiment.
Figure 3B:
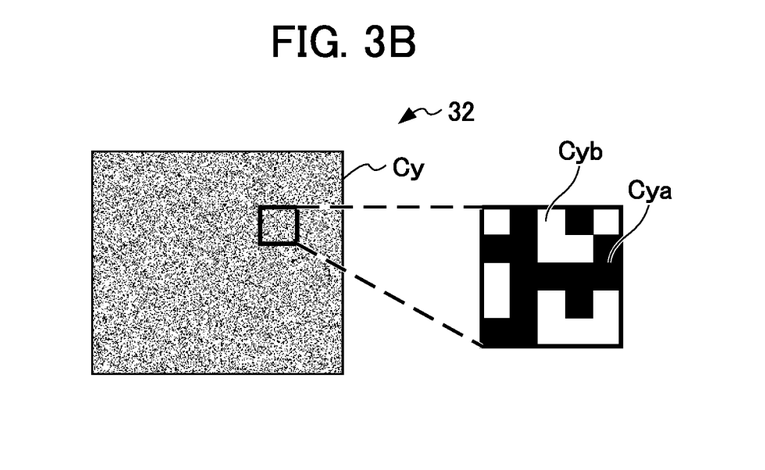
FIG. 3B is a diagram illustrating an example of a pattern image of the information recording object according to the embodiment.
Figure 4:
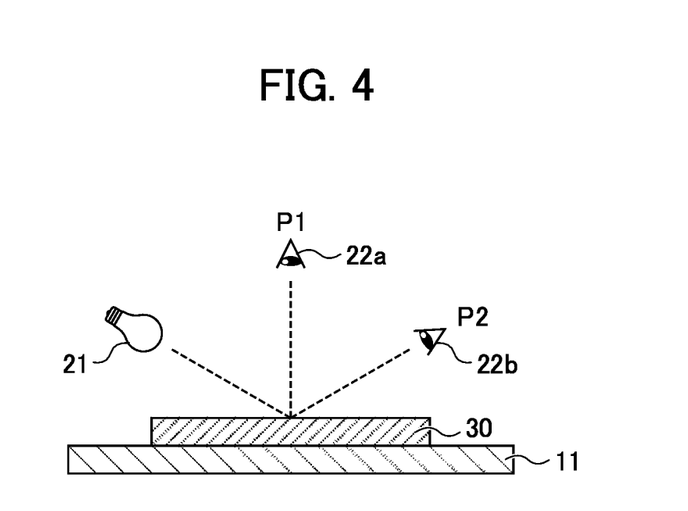
FIG. 4 is a diagram illustrating a viewing mode based on a structure of the information recording object according to the embodiment.

Next, the printing of the lustrous layer 31 and the transparent layer 32 in a printing region with a fixed area which is printed through the printing process of the information recording object 30 will be described with the printing condition in which an area covering a bed represented by % is defined as an area ratio, and particularly, the printing condition in which the bed can be hidden by halftone is defined as a halftone area ratio. FIGS. 2A, 2B, 3A, and 3B are diagrams illustrating examples of pattern images of the information recording object 30 according to the embodiment. FIG. 4 is a diagram illustrating a viewing mode based on the structure of the information recording object 30 according to the embodiment.

Figure 2A:
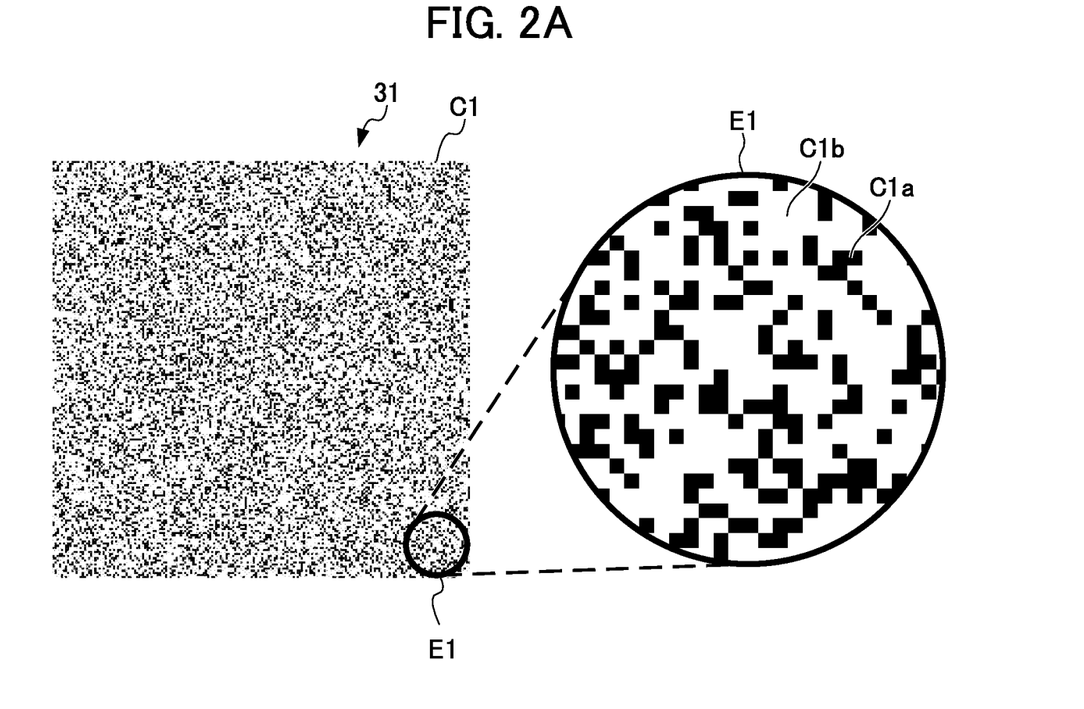
FIG. 2A is a diagram illustrating an example of a pattern image of an information recording object according to the embodiment.

FIG. 2A illustrates an enlarged view of an image C1 (first image) of the lustrous layer 31 and a region E1 which is a portion of the image C1. The lustrous layer 31 is a layer on which the image C1 is printed. The image C1 is a pattern image in which a foreground portion C1a and a background portion C1b are expressed in two values as illustrated in the region E1. The foreground portion C1a is printed with a halftone area ratio of, for example, 100%, and the background portion C1b is printed with a halftone area ratio of, for example, 75%. However, this ratio is an example, but the invention is not limited thereto. For example, the halftone area ratio of the foreground portion C1a may be less than 100%, and the halftone area ratio of the background portion C1b may be other than 75%. In this case, it is preferable that a difference in the halftone area ratio between the foreground portion C1a and the background portion C1b be equal to or greater than 15% and equal to or less than 50%. In addition, the densities of the foreground portion C1a and the background portion C1b may be reversed.

Figure 2B:
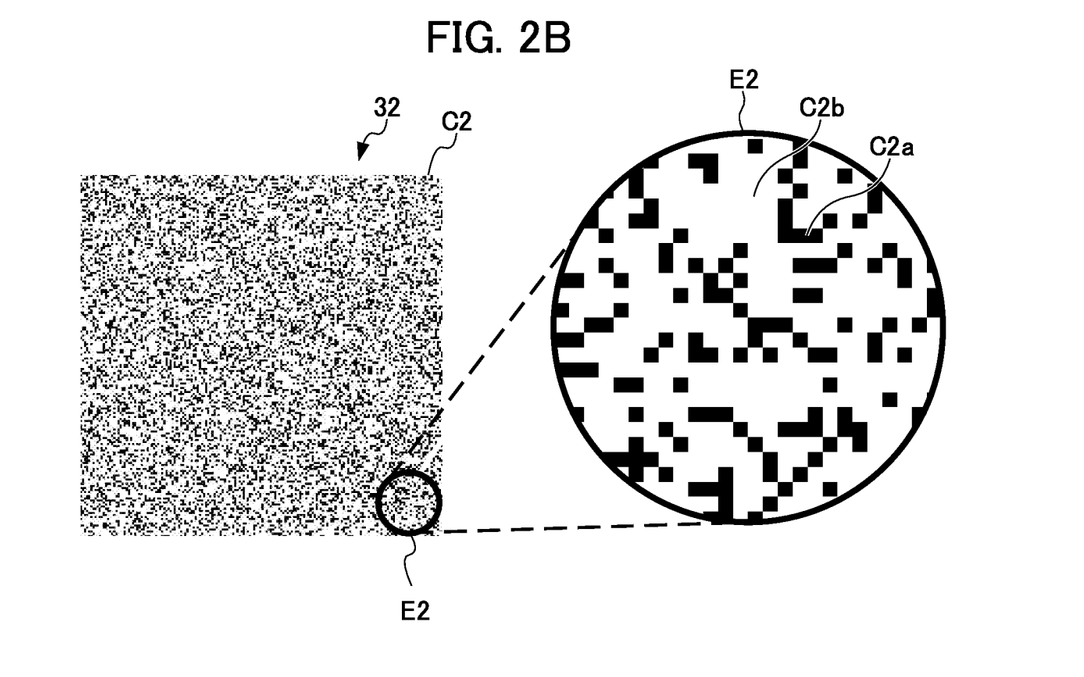
FIG. 2B is a diagram illustrating an example of a pattern image of the information recording object according to the embodiment.

FIG. 2B illustrates an enlarged view of an image C2 (second image) of the transparent layer and a region E2 which is a portion of the image C2. The transparent layer 32 is a layer on which the image C2 is printed. The image C2 is a pattern image in which a foreground portion C2a and a background portion C2b are expressed in two values as illustrated in the region E2. The foreground portion C2a is printed with a halftone area ratio of, for example, 100%, and the background portion C2b is printed with a halftone area ratio of, for example, 25%. However, this ratio is also an example, but the invention is not limited thereto. For example, the halftone area ratio of the foreground portion C2a may be less than 100%, and the halftone area ratio of the background portion C2b may be equal to or greater than or equal to or less than 25% as long as there is a predetermined difference from the foreground portion C2a. In addition, the densities of the foreground portion C2a and the background portion C2b may be reversed. The density difference between the foreground portion C2a and the background portion C2b is greater than the density difference between the foreground portion C1a and the background portion C1b. Thus, the image C1 of the lustrous layer 31 and the image C2 of the transparent layer 32 of the information recording object 30 are pattern images, and thus, these images are meaningless images at first glance.

Herein, the lustrous layer 31 and the transparent layer 32 of the information recording object 30 are not limited to those on which a pattern image including a foreground portion and a background portion is printed. FIGS. 3A and 3B illustrate a case in which an image Cx of the lustrous layer 31 and an image Cy of the transparent layer 32 are pattern images configured to include only the foreground portion. In this case, printing regions Cxa and Cya of the images Cx and Cy are printed with a halftone area ratio of 100%, and the pattern images are expressed in two values by using the printing regions Cxa and Cya and the non-printing regions Cxb and Cyb, which are not printed.

Next, the pattern images illustrated in FIGS. 2A, 2B, 3A, and 3B will be described. The pattern image is an image generated according to a specific rule. The pattern image can represent feature points and lines in a spatial frequency domain that is frequency-converted by performing, for example, Fourier transform. For example, when a feature point can be expressed by performing the converting process on the pattern image, the point expressed by performing the converting process on the image C1 has a relationship that hinders the point expressed by performing the same converting process on the image C2. That is, the point expressed by performing the converting process on the image C2 cannot be reproduced at the point expressed by performing the converting process on the combined image including the image C1 and the image C2. Herein, the specific rule is not limited to the Fourier transform and may be another transform process. For example, a converting process for a barcode, a converting process for a two-dimensional code such as a QR code (registered trademark), or the like may be used.

In the information recording object 30 described above, a recognizable image varies depending on an angle of viewpoint (an viewing angle). FIG. 4 illustrates three positional relationships among an illumination light source 21, a viewpoint 22, and an information recording object 30 in a diffusible reflection region and a regular reflection (specular reflection) region. When the viewpoint 22 (22a) is located at a position P1 with respect to the positions of the illumination light source 21 and the information recording object 30, the object is viewed in the diffusible reflection region. In addition, when the viewpoint 22 (22b) is located at the position P2 with respect to the positions of the illumination light source 21 and the information recording object 30, the object is viewed in the regular reflection region. Hereinafter, the image C1 and the image C2 illustrated in FIGS. 2A and 2B will be described as an example.

When the information recording object 30 includes only the lustrous layer 31, since a large difference is caused in reflected light quantity in the diffusible reflection region due to the density difference between the foreground portion C1a and the background portion C1b of the image C1 in FIG. 2A, the foreground portion C1a and background portion C1b can be distinguished. On the other hand, in the regular reflection region, since the reflected light quantities of both the foreground portion C1a and the background portion C1b increase, the difference therebetween cannot be detected, and the foreground portion C1a and the background portion C1b cannot be distinguished.

Next, when the information recording object 30 includes only the transparent layer 32, the foreground portion C2a and the background portion C2b of FIG. 2B are transparent, and thus cannot be distinguished in the diffusible reflection region. On the other hand, in the regular reflection region, since the reflected light quantities vary due to the density difference between the foreground portion C2a and the background portion C2b, the foreground portion C2a and the background portion C2b can be distinguished. When the transparent layer 32 is formed on the lustrous layer 31 in the information recording object 30, since the foreground portion C1a and the background portion C1b can be distinguished and the foreground portion C2a and the background portion C2b cannot be distinguished in the diffusible reflection region, the foreground portion C1a and the background portion C1b are observed as a whole. In addition, since the foreground portion C1a and the background portion C1b cannot be distinguished but the foreground portion C2a and the background portion C2b can be distinguished in the regular reflection region, the foreground portion C2a and the background portion C2b are observed as a whole.

In this manner, the lustrous layer 31 and the transparent layer 32 are formed by using materials (such as inks) having different reflected light quantities depending on the viewing angle, so that the image of the lustrous layer 31 and the image of the transparent layer 32 may be visible or invisible depending on the viewing angle and thus can render various presentation modes. As illustrated in FIG. 1B, the transparent layer 32 is slightly smaller than the lustrous layer 31. That is, in the information recording object 30, the size of the portion provided with the lustrous layer 31 and the portion provided with the transparent layer 32 are different. For this reason, it becomes easy to distinguish between the state in which the lustrous layer 31 is observed and the state in which the transparent layer 32 is observed, and the angle at which the transparent layer 32 can be observed can be easily understood. In addition, the pattern image included in the transparent layer 32 is used for authenticity determination, but the pattern image included in the lustrous layer 31 is can be easily checked in a region other than the regular reflection region. For this reason, the pattern image of the transparent layer 32 can maintain a state that the pattern image is difficult to visually understand.

<Copying of Printed Matter 10>

Figure 5A:
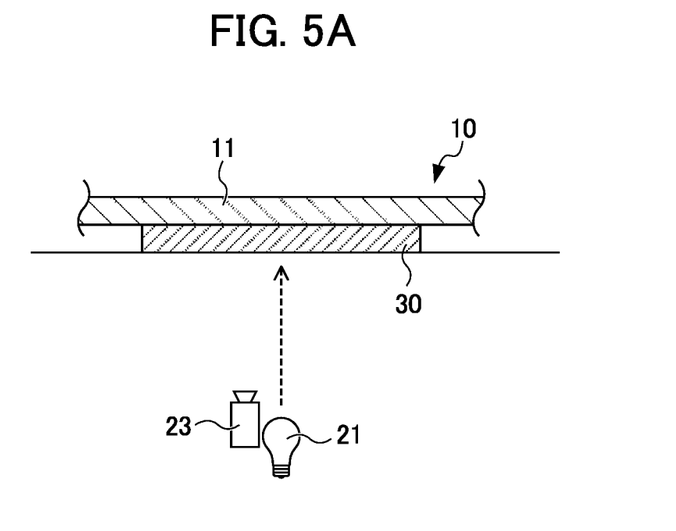
FIG. 5A is a diagram illustrating a positional relationship between an illumination light source and a camera when copying a printed matter according to the embodiment.
Figure 5B:
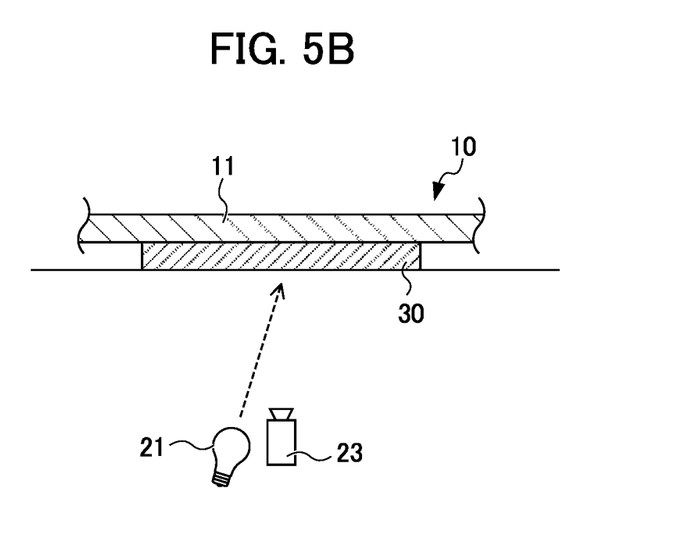
FIG. 5B is a diagram illustrating a positional relationship between the illumination light source and the camera when copying the printed matter according to the embodiment.

Next, a case in which the printed matter 10 is copied will be described. FIGS. 5A and 5B are diagrams illustrating a positional relationship between the illumination light source 21 and the camera 23 at the time of copying the printed matter 10 according to the embodiment. FIGS. 5A and 5B illustrate the positional relationship among the illumination light source 21, the camera 23, and the printed matter 10 of a copying machine such as a copier. In the state where the information recording object 30 of the printed matter 10 is irradiated with light from the illumination light source 21 illustrated in FIG. 5A or 5B, an image thereof is acquired by the camera 23.

FIG. 5A illustrates a case in which the illumination light source 21 and the camera 23 are located in the direction perpendicular to the information recording object 30 and the camera 23 acquires an image. FIG. 5B illustrates a case in which the illumination light source 21 irradiates the information recording object 30 from a direction slightly inclined thereto and the camera 23 captures an image of the information recording object 30 in the direction perpendicular thereto to acquire an image. In any case, the camera 23 captures images of both the lustrous layer 31 and the transparent layer 32 of the information recording object 30 depending on the positional relationship between the illumination light source 21 and the information recording object 30. In the copying machine, a copied product of the printed matter 10 is produced on the basis of the image obtained by the camera 23 in this manner.

The copied product includes a printed object at a position corresponding to the information recording object 30 (see FIG. 1A) of the printed matter 10. The printed object has a combined image of the pattern image of the lustrous layer 31 and the pattern image of the transparent layer 32 of the information recording object 30. In addition, the printed object has a layer made of a black ink containing general carbon. Accordingly, even when the printed object is observed at an viewing angle in any region (such as the diffusible reflection region or the regular reflection region), only the combined image is viewed in the printed object. Therefore, in the printed object, only the pattern image of the transparent layer 32 cannot be observed.

Figure 6A:
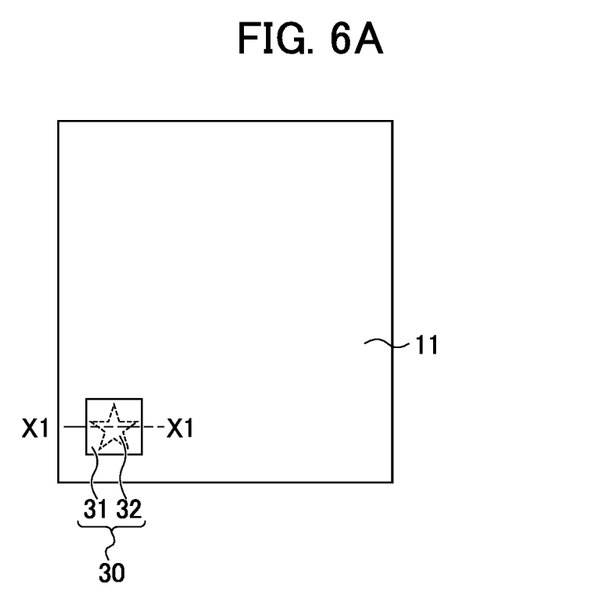
FIG. 6A is a diagram illustrating a specific example of the information recording object according to the embodiment.
Figure 6B:
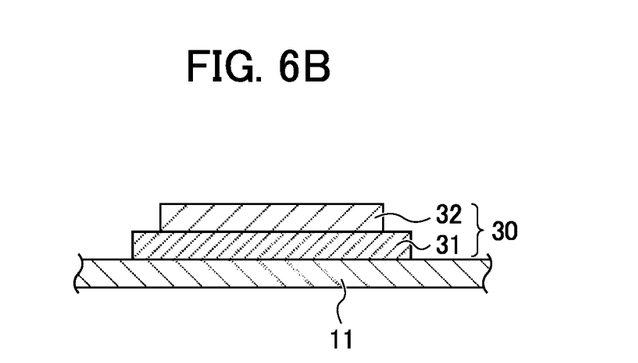
FIG. 6B is a diagram illustrating the specific example of the information recording object according to the embodiment.

Next, a specific example of the information recording object 30 will be described. FIGS. 6A to 8B are diagrams illustrating specific examples of the information recording object 30 according to the embodiment. In FIGS. 6A and 6B, the information recording object 30 includes the lustrous layer 31 and the transparent layer 32 on the sheet 11. And, as illustrated to FIG. 6A, the transparent layer 32 represents a pattern. In this example, the transparent layer 32 represents a star pattern. FIG. 6B is a partial schematic cross-sectional view taken along the line X1-X1 in FIG. 6A. As illustrated in FIG. 6B, the transparent layer 32 is formed on a portion of the lustrous layer 31. As described above, in the information recording object 30, the area where the lustrous layer 31 is formed and the area where the transparent layer 32 is formed do not match in plan view, and the size and shape are different. Moreover, the area in which the transparent layer 32 is formed constitutes the pattern. For this reason, it becomes easy to distinguish between the state in which the lustrous layer 31 is observed and the state in which the transparent layer 32 is observed, and the angle at which the transparent layer 32 can be observed can be easily understood. Moreover, by setting the pattern image represented by the transparent layer 32 as a star pattern, the star pattern can be observed by observing from the regular reflection region. For this reason, it can be more easily understood from the pattern that the region is the regular reflection region.

Figure 7A:
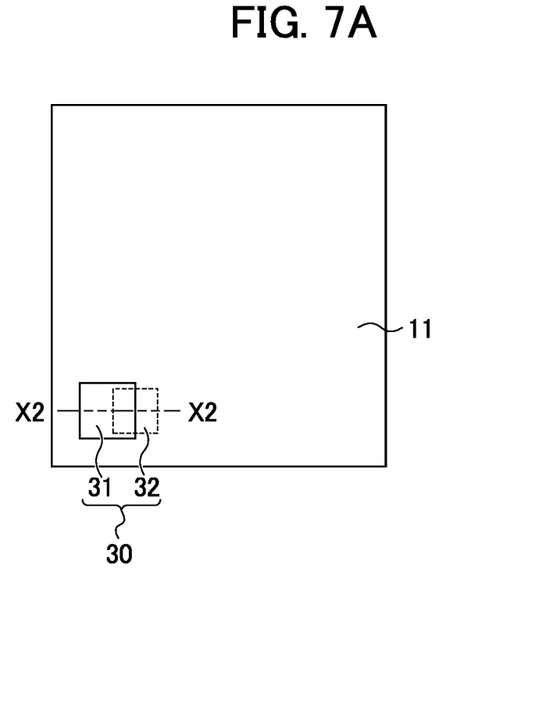
FIG. 7A is a diagram illustrating a specific example of the information recording object according to the embodiment.
Figure 7B:
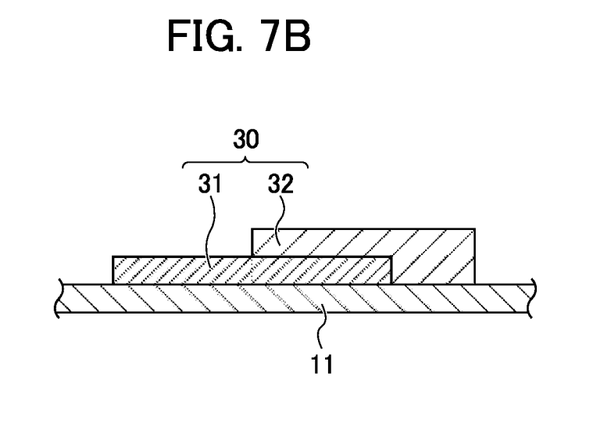
FIG. 7B is a diagram illustrating the specific example of the information recording object according to the embodiment.

In FIGS. 7A and 7B, the information recording object 30 is configured by a lustrous layer 31 and a transparent layer 32 on the sheet 11. Then, as illustrated in FIG. 7A, the transparent layer 32 overlaps a portion of the lustrous layer 31 and partially protrudes on the sheet 11. FIG. 7B is a partial schematic cross-sectional view taken along the line X2-X2 in FIG. 7A. As illustrated in FIG. 7B, in the information recording object 30, the area where the lustrous layer 31 is formed and the area where the transparent layer 32 is formed do not match in plan view, and the size and position are different. Therefore, it becomes easy to distinguish between the state in which the lustrous layer 31 is observed and the state in which the transparent layer 32 is observed, and the angle at which the transparent layer 32 can be observed can be easily understood.

Figure 8A:
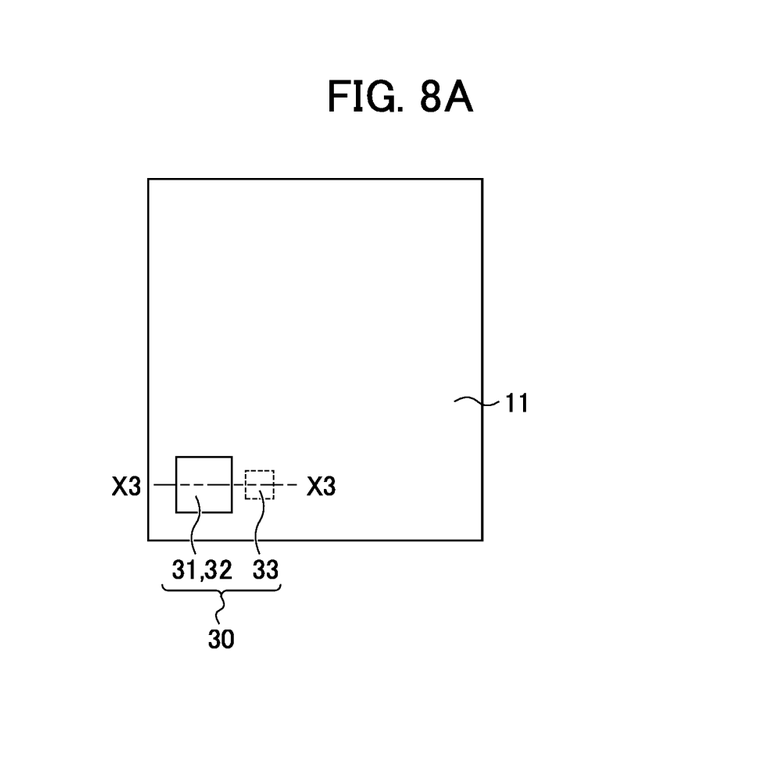
FIG. 8A is a diagram illustrating a specific example of an information recording object according to the embodiment.
Figure 8B:
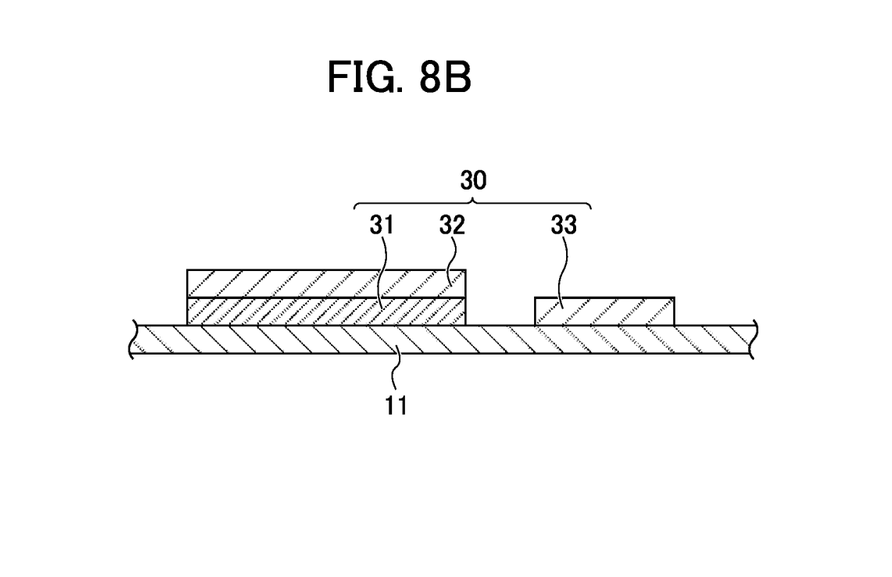
FIG. 8B is a diagram illustrating the specific example of the information recording object according to the embodiment.

In FIGS. 8A and 8B, the information recording object 30 is configured with the lustrous layer 31, the transparent layer 32, and a transparent layer 33 (angle-specifying area) on the sheet 11. As illustrated in FIG. 8A, the transparent layer 33 is provided at a position different from the positions of the lustrous layer and the transparent layer 32. The transparent layer 33 is a layer on which a solid image is printed with a transparent ink, for example, with a halftone area ratio of 100%. Since the transparent layer 33 is used for enabling viewing in the regular reflection region, the transparent layer 33 may have any shape, and the pattern image need not be printed. FIG. 8B is a partial schematic cross-sectional view taken along the line X3-X3 in FIG. 8A. As illustrated in FIG. 8B, the lustrous layer 31 and the transparent layer 32 have the same size, and the transparent layer 32 is formed so as to overlap the lustrous layer 31. Thus, by providing the transparent layer 33 at a position different from the position of the combined image including the lustrous layer 31 and the transparent layer 32, the transparent layer 33 can be observed in the case of being observed in the regular reflection region, so that the regular reflection region can be allowed to be understandable. In addition, since the lustrous layer 31 and the transparent layer 32 overlap each other in the same size, there is an effect of making it difficult to observe the transparent layer 32 even in the regular reflection region. For this reason, it is possible to prevent the fact that authenticity information is contained in the transparent layer 32 of the information recording object 30 from being known and to improve the confidentiality.

<Reading Device 5>

Figure 9:
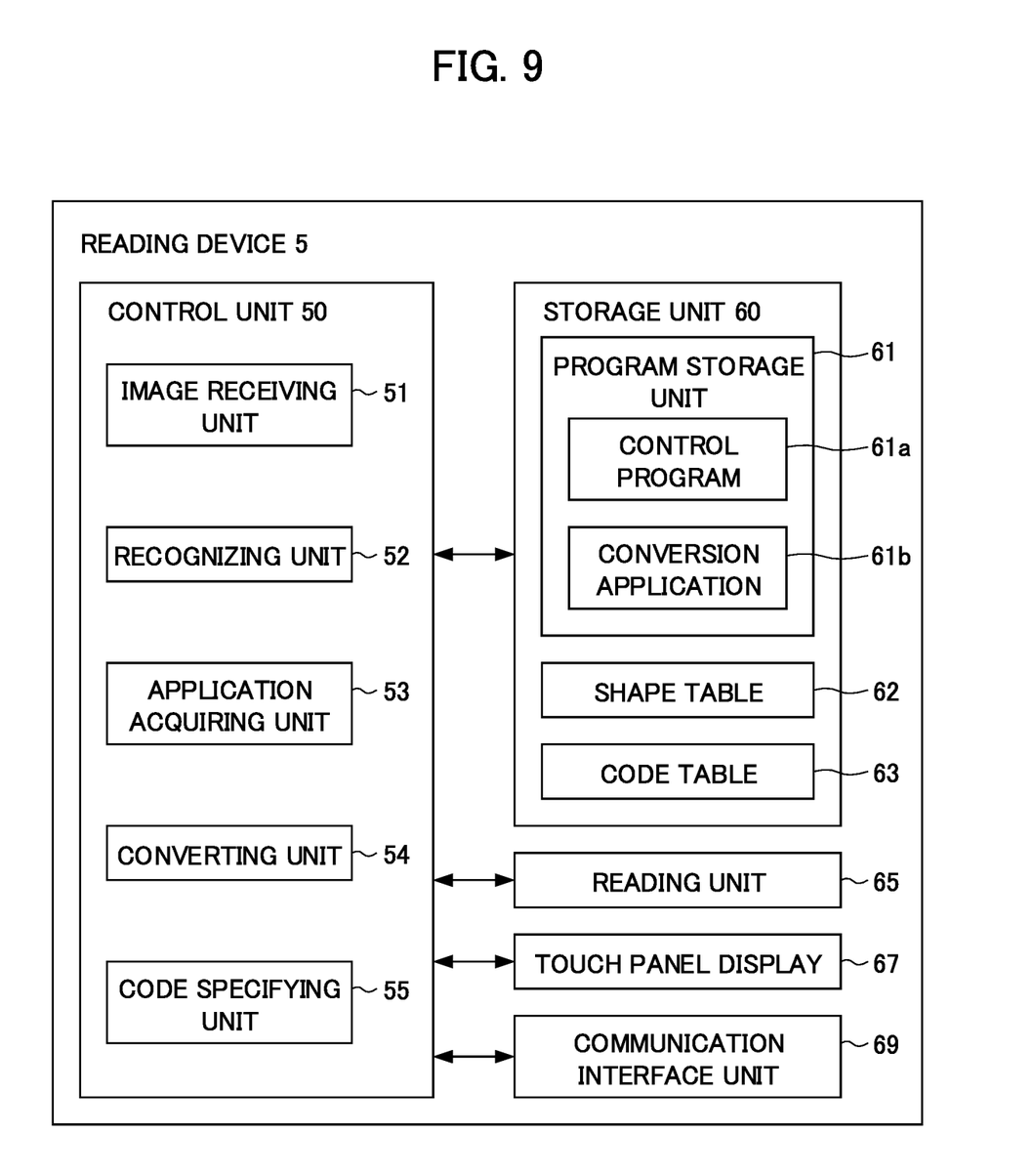
FIG. 9 is a functional block diagram of a reading device according to the embodiment.

Next, a reading device 5 that reads a code from the information recording object 30 of the printed matter 10 will be described. FIG. 9 is a functional block diagram of the reading device 5 according to the embodiment. The reading device 5 is, for example, a mobile terminal represented by a smartphone. The reading device 5 includes a control unit 50, a storage unit 60, a reading unit 65, a touch panel display 67, and a communication interface unit 69. The control unit 50 is a central processing unit (CPU) that controls the reading device 5 as a whole. The control unit 50 implements various functions in cooperation with the above-mentioned hardware by appropriately reading and executing an operating system (OS) or an application program stored in the storage unit 60. The control unit 50 includes an image receiving unit 51, a recognizing unit 52, an application acquiring unit 53, a converting unit 54, and a code specifying unit 55.

The image receiving unit 51 receives the image data of the information recording object 30 through the reading unit 65 when the reading unit 65 reads the information recording object 30. The recognizing unit 52 checks whether or not the image data received by the image receiving unit 51 includes a specific shape stored in a shape table 62. When the recognizing unit 52 recognizes the specific shape, the application acquiring unit 53 connects to an application distribution server (not illustrated) that stores various application programs through a communication interface unit 59 and acquires a conversion application 61b. And the application acquiring unit 53 stores the acquired conversion application 61b in a program storage unit 61 described later. The converting unit 54 performs predetermined conversion on the image data received by the image receiving unit 51 by using a control program 61a or the acquired conversion application 61b described late and acquires data for code generation. The code specifying unit 55 specifies a code from the data acquired by the converting unit 54 with reference to a code table 63.

The storage unit 60 is a memory area of a hard disk, a semiconductor memory device, or the like for storing programs, data, and the like required for causing the control unit 50 to perform various processes. The computer refers to an information processing device including a control unit, a storage device, and the like, and the reading device 5 is an information processing device including the control unit 50, the storage unit 60, and the like and is included in the concept of a computer. The storage unit 60 stores the program storage unit 61, the shape table 62, and the code table 63. The program storage unit 61 is a memory area for storing various programs. The program storage unit 61 stores the control program 61a and the conversion application 61b. The control program 61a is a program for executing each function of the control unit 50. The conversion application 61b is a dedicated application corresponding to a specific shape for reading a code. When downloaded from the application distribution server, the conversion application 61b is stored in the program storage unit 61. The shape table 62 is a table that stores a shape that can be observed by a predetermined transparent layer 32 and a uniform resource locator (URL) of the application distribution server in association with each other. The code table 63 is a table that stores codes.

The reading unit 65 is, for example, a camera and is a device that acquires printing details such as images and characters as images. The touch panel display 67 has a function as a display unit configured with a liquid crystal panel or the like and a function as an input unit for detecting a touch input by a user's finger or the like. The communication interface unit 69 is an interface for performing communication with, for example, a distribution server.

<Process of Reading Device 5>

Figure 10:
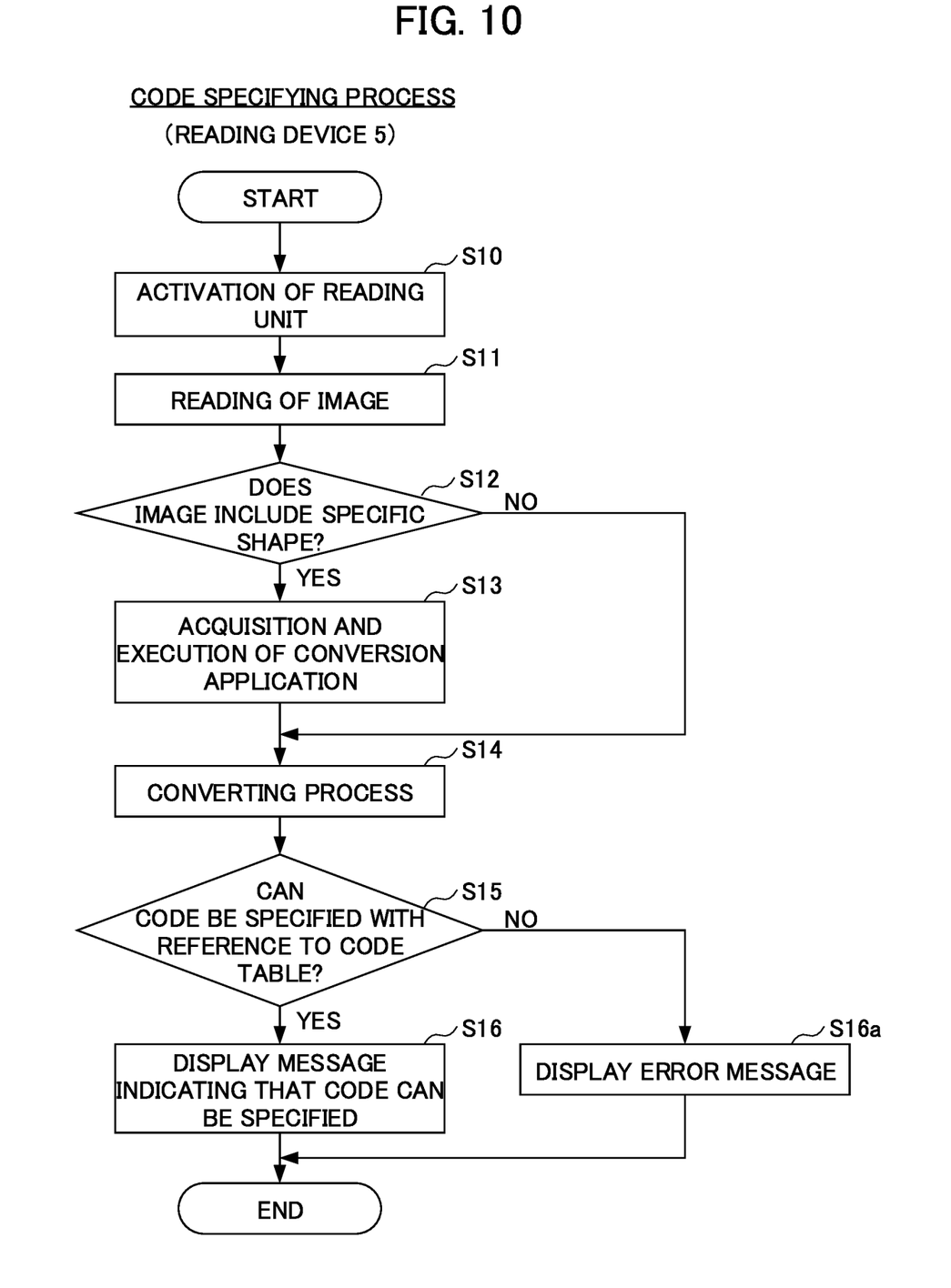
FIG. 10 is a flowchart illustrating a code specifying process in the reading device according to the embodiment.

A process of the reading device 5 will be described below. FIG. 10 is a flowchart illustrating a code specifying process in the reading device 5 according to the embodiment. In step S (hereinafter simply referred to as "S") 10, the control unit 50 of the reading device 5 activates the reading unit 65. In S11, the control unit 50 (the image receiving unit 51) reads an image using the reading unit 65. Herein, a user can allow the reading unit 65 to read an image from an angle at which only the pattern image of the transparent layer 32 of the information recording object 30 can be read. In addition, the user can allow the reading unit 65 to read an image from an angle at which only the pattern image of the lustrous layer 31 of the information recording object 30 can be read. Furthermore, the user can allow the reading unit 65 to read an image from an angle at which the pattern images of both the lustrous layer 31 and the transparent layer 32 of the information recording object 30 can be read. In order to read the image from the angle at which only the pattern image of the transparent layer 32 can be read, the user performs operations of reading the image by specifying a regular reflection region where the transparent layer 32 (or the transparent layer 33) is visible.

In S12, the control unit 50 (recognizing unit 52) determines whether or not the shape of the read image is included in the specific shape stored in the shape table 62. When the shape of the read image is included in the specific shape (S12: YES), the control unit 50 transfers the process to S13. On the other hand, when the shape of the read image is not included in the specific shape (S12: NO), the control unit 50 transfers the process to S14. A case in which the shape of the read image is not included in the specific shape is, for example, a case in which the lustrous layer 31 and the transparent layer 32 overlap each other as illustrated in FIGS. 8A and 8B. In S13, the control unit 50 refers to the shape table 62 and connects to the URL corresponding to the specific shape. And the control unit 50 (application acquiring unit 53) acquires the conversion application 61b from the application distribution server and executes the conversion application.

In S14, the control unit 50 (converting unit 54) executes the converting process on the read image and acquires the data for the code generation. Herein, the converting process is executed by the control program 61a or the conversion application 61b. In S15, the control unit 50 (code specifying unit 55) determines whether or not a code corresponding to the acquired data can be specified with reference to the code table 63. When there is data that matches the acquired data in the code table 63, the code can be specified. When a code can be specified (S15: YES), the control unit 50 transfers the process to S16. On the other hand, when a code cannot be specified (S15: NO), the control unit 50 transfers the process to S16a. In S16, the control unit 50 displays a message indicating that the code can be specified on the touch panel display 67. Thereafter, the control unit 50 ends the process. In addition, after the process is ended, the control unit 50 performs a process based on the specified code. On the other hand, in S16a, the control unit 50 displays an error message on the touch panel display 67. Thereafter, the control unit 50 ends the process.

Herein, when the reading unit 65 reads an image from an angle at which only the pattern image of the transparent layer 32 can be read, the control unit 50 acquires only the pattern image of the transparent layer 32. When the pattern image of the transparent layer 32 has a specific shape (S12: YES), the conversion application 61b corresponding to the specific shape is executed to acquire the data for the code generation (S14). Herein, since the code corresponding to the pattern image of the transparent layer 32 is stored in the code table 63, the control unit 50 can specify the code (S15: YES). In addition, when the pattern image of the transparent layer 32 has not a specific shape (S12: NO), the data for the code generation is acquired by the control program 61a (S14). Herein, since the code corresponding to the pattern image of the transparent layer 32 is stored in the code table 63, the control unit 50 can specify the code (S15: YES).

On the other hand, when the reading unit 65 reads an image from an angle at which both the pattern images of the transparent layer 32 and the lustrous layer 31 can be read, the control unit 50 does not acquire only the pattern image of the transparent layer 32. Only the codes corresponding to the pattern image of the transparent layer 32 are stored in the code table 63, and for example, the codes corresponding to both the pattern images of the transparent layer 32 and the lustrous layer 31 are not stored. That is, by combining the pattern image of the lustrous layer 31 with the pattern image of the transparent layer 32, the pattern image of the lustrous layer 31 hinders the specifying of the code obtained from the pattern image of the transparent layer 32. As described above, the data for generating the code corresponding to the pattern image of the lustrous layer 31 is data hindering the code obtained from the pattern image of the transparent layer 32 from being specified. Therefore, even if the data for the code generation is acquired by the control program 61a (S14), the control unit 50 cannot specify the code (S15: NO). In addition, when the reading unit 65 reads an image from an angle at which only the pattern image of the lustrous layer 31 can be read or an angle at which both the pattern images of the transparent layer 32 and the lustrous layer 31 can be read, the control unit 50 determines that the read image does not include the specific shape stored in the shape table 62 (S12: NO). Therefore, the control unit 50 performs the processes for acquiring the data for the code generation by the control program 61*a* (S14).

Thus, according to the embodiment, the following effects are obtained.

(1) Since the information recording object 30 allows the transparent layer 32 to be formed on a portion of the lustrous layer 31, the image C2 of the transparent layer 32 can be easily observed. The image C2 of the transparent layer 32 can be observed in the case of being observed in the regular reflection region. Therefore, if the image is read at an viewing angle at which the image C2 of the transparent layer 32 can be observed, the code can be read by the converting process.

(2) By allowing the transparent layer 32 to constitute a pattern, the pattern can be allowed to be more visually understandable.

(3) When the transparent layer 32 is formed on the lustrous layer 31 by overlapping in the same size to form the combined image, the information recording object 30 has the transparent layer 33 at a position different from the position of the combined image, so that the image of the transparent layer 33 can be easily observed. In addition, the transparent layer 32 of the combined image is formed on the lustrous layer 31 in the same size, so that it can be difficult to visually understand and the fact that information is contained is not known to the surroundings.

(4) Since the image C1 is included in the lustrous layer 31 and the image C2 is included in the transparent layer 32, the image C1 and the image C2 can be switched and observed depending on the viewing angle of the information recording object 30. Then, the lustrous layer 31 can be made of a lustrous ink containing a lustrous material, and the transparent layer 32 can be made of a transparent ink or the like, so that printing to be switched can be carried out at a low cost.

(5) By causing the reading device 5 to read the information recording object 30 at the viewing angle at which only the image C2 can be observed, the reading device 5 can read the code from the data obtained by performing the converting process on the image C2. In addition, when the reading device 5 reads a printed object of a copied product in which only the combined image including the image C1 and the image C2 can be observed, since the data hindering the specifying of the code corresponding to the image C2 is generated in the image C1, it is possible to prevent the code from being read from the data obtained by converting the combined image.

(6) When the image C2 forms a specific shape, the conversion application 61*b* corresponding to the specific shape can be acquired, and the converting process can be performed. Therefore, the converting process can be performed using the conversion application 61*b* that is different for each shape.

While an embodiment of the invention has been described above, the invention is not limited to the embodiment. The advantages described in the embodiment are only the most suitable advantages which can be obtained in the invention listed and the advantages of the invention are not limited to those described in the embodiment. In addition, the above-described embodiment and modifications to be described later may be used in combination as appropriate, and detailed description thereof will be omitted.

(Modifications)

(1) In the embodiment, the lustrous layer 31 has been described as having a square shape, but the invention is not limited thereto. The lustrous layer 31 may have another shape such as a rectangular shape, a circular shape, or an elliptical shape. In addition, the shape formed by the transparent layer 32 has been described as a star pattern, but other shapes and patterns such as a heart pattern and a triangle may be used. The shape formed by the transparent layer 32 may be a QR code or the like.

(2) In the embodiment, the information recording object 30 including the lustrous layer 31 and the transparent layer 32 has been described as an example. However, the invention is not limited thereto. Each pattern image may be formed of a lustrous material and a transparent material, and the pattern image may not be printed on the layer. In addition, the printing of the pattern image in which the code is embedded may be configured with a color element having high brightness, and the printing of the pattern image that hinders the specifying of the embedded code may be configured with a color element having low brightness.

(3) In the embodiment, a case in which the transparent layer 32 is directly formed on the lustrous layer 31 has been described as an example, but the invention is not limited thereto. For example, a substrate such as a transparent film may be provided between the lustrous layer 31 and the transparent layer 32. Moreover, for example, even if the transparent layer 32 is formed on the lustrous layer 31 described in the embodiment, the transparent layer 32 may further have a substrate such as a transparent film. Thus, by having a substrate such as a transparent film, the portion of the lustrous layer 31 that is a layer below the transparent film is less likely to be scrapped.

(4) In the embodiment, the case of printing the pattern image has been described as an example, but the invention is not limited thereto. The pattern image may be formed by a method other than printing such as transfer or laser drawing.

(5) In the embodiment, the printed matter 10 having the information recording object 30 has been described to be a ticket as an example, but the invention is not limited thereto. For example, a card used in a game, a security protection label, or the like may be used. In addition, the information recording object 30 may be used for digital watermarking.

(6) In the embodiment, the reading device has been described to be a mobile terminal as an example, but the invention is not limited thereto. For example, the reading device may be a personal computer. The reading unit may be a scanner or the like.

(7) In the embodiment, the process by the reading device of determining whether or not the shape of the read image is included in the specific shape stored in the shape table and of performing conversion by using the conversion application corresponding to the specific shape has been described as an example, but the invention is not limited thereto. For example, when the transparent layer forms a pattern, if the shape of the read image is included in the specific shape stored in the shape table, the converting process may be allowed to be performed, and if the shape of the read image is not included in the specific shape stored in the shape table, the converting process may not be allowed to be performed. In addition, once an image is read, the converting process may be performed uniformly.

EXPLANATION OF REFERENCE NUMERALS

5 READING DEVICE
10 PRINTED MATTER

21 ILLUMINATION LIGHT SOURCE
23 CAMERA
30 INFORMATION RECORDING OBJECT
31 LUSTROUS LAYER
32, 33 TRANSPARENT LAYER
50 CONTROL UNIT
60 STORAGE UNIT
61a CONTROL PROGRAM
61b CONVERSION APPLICATION
62 SHAPE TABLE
63 CODE TABLE
65 READING UNIT
C1, C2, Cx, Cy IMAGE

The invention claimed is:

1. An information recording object having a combined image including a first image and a second image formed on the first image,
wherein the first image and the second image are different pattern images generated by a specific rule,
wherein each of the first and second images is configured so as to have a different reflected light quantity depending on a viewing angle,
wherein the first image is made of a lustrous material,
wherein the second image is made of a transparent material,
wherein at least one of the first and second images in the combined image is recognizable depending on the viewing angle,
wherein the combined image has an angle-specifying area formed by using a material having the same reflected light quantity as the second image,
wherein the angle-specifying area is a second image area where the second image is formed,
wherein the second image area is formed in a portion of a first image area where the first image is formed, and
wherein the second image area is different in size from the first area.

2. The information recording object according to claim 1, wherein the second image area is smaller than the first image area.

3. The information recording object according to claim 2, wherein the second image area constitutes a pattern.

4. The information recording object according to claim 1, wherein the angle-specifying area is disposed at a position different from that of an area having the combined image.

5. The information recording object according to claim 1, wherein the angle-specifying area is a second image area where the second image is formed, and at least a portion of the angle-specifying area protrudes from a first image area where the first image is formed.

6. The information recording object according to claim 1, wherein data corresponding to a code is generated by performing a converting process corresponding to the rule on the second image, and
wherein data hindering the code corresponding to the second image is generated by performing the converting process corresponding to the rule on the first image.

7. The information recording object according to claim 1, wherein the first image is formed with a color element having low brightness, and
wherein the second image is arranged on a viewing side of the first image and is formed with a color element having brightness higher than that of the first image.

8. The information recording object according to claim 1, wherein the angle-specifying area is disposed at a position different from that of an area having the combined image and does not overlap with the first image area in which the first image is formed.

* * * * *